UNITED STATES PATENT OFFICE.

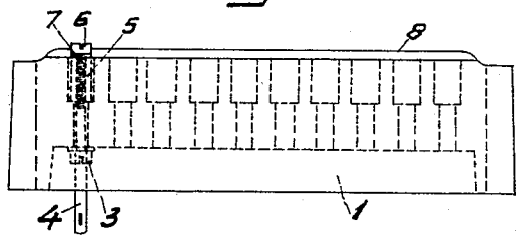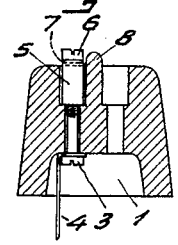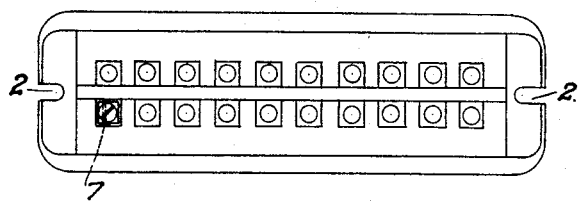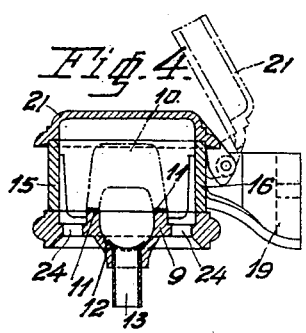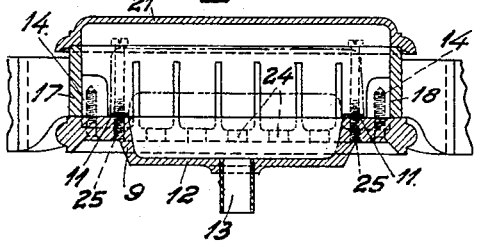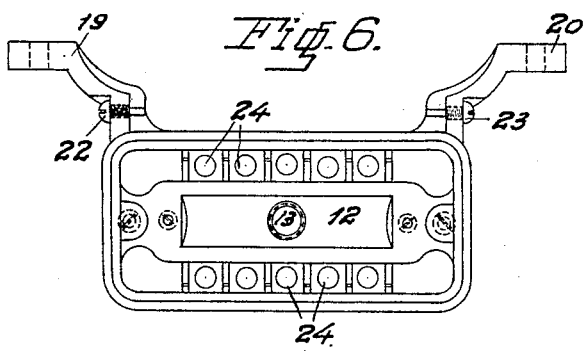

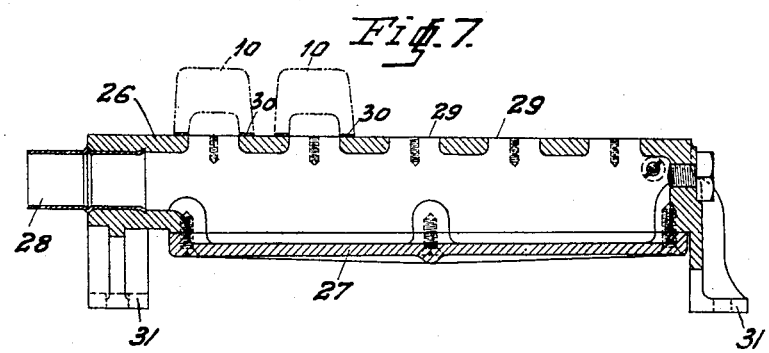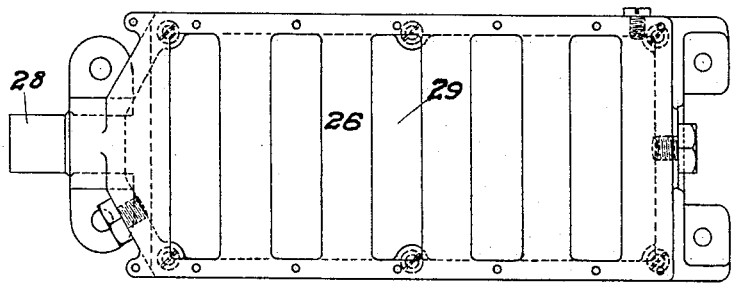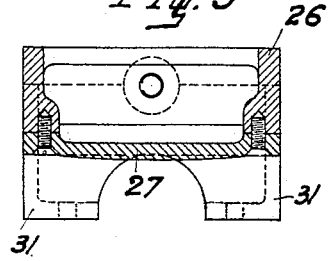

KARL FREDRIK WINCRANTZ, CARL ERIK JEAN NILSON, AND CARL FILIP PETTERSSON, OF STOCKHOLM, SWEDEN, ASSIGNORS TO AKTIEBOLAGET STOCKHOLM-STELEFON, OF STOCKHOLM, SWEDEN, A CORPORATION.

TELEPHONE-CABLE BOX.

1,173,332.

Specification of Letters Patent.

Patented Feb. 29, 1916.

Application filed July 19, 1911. Serial No. 639,378.

*To all whom it may concern:*

Be it known that we, KARL FREDRIK WINCRANTZ, a subject of the King of Sweden, and resident of Bränkyrkogatan 14ᴬ, Stockholm, in the Kingdom of Sweden, CARL ERIK JEAN NILSON, a subject of the King of Sweden, and resident of Grefturegatan 47, Stockholm, in the Kingdom of Sweden, and CARL FILIP PETTERSSON, a subject of the King of Sweden, and resident of Vegagatan 10, Stockholm, in the Kingdom of Sweden, have invented certain new and useful Improvements in Telephone-Cable Boxes, of which the following is a specification, reference being had therein to the accompanying drawings.

This invention relates to a terminal block for telephone cables and to cable-boxes adapted for one or several such blocks.

In the accompanying drawings, Figure 1 shows the terminal block in side view, Fig. 2 the same in plan view, and Fig. 3 a transverse section of the same. Fig. 4 shows a transverse section of a cable box for a 20-wire cable, Fig. 5 a longitudinal section of the same and Fig. 6 the cable box seen from beneath. Fig. 7 shows a longitudinal section of a cable box for a 100-wire cable (for five terminal blocks, each being adapted for 20 wires); Fig. 8 shows a top view of the cables box last mentioned and Fig. 9 a transverse section of the same.

The terminal block consists of an oblong plate having the form of a parallelopiped and provided with a plane underside. The underside is provided with a recess 1. At the ends of the block there are provided recesses 2, forming slots for screws, by means of which the block is secured to the base. For the connection of the cable-wires there are arranged two series of connecting terminals passing through the block. Each of these consists of a screw 3, beneath which a connecting spring 4 or the like is clamped. The screw 3 is screwed in a square connection piece 5, in the opposite end of which the connection screw 6 is screwed. The outer connection wire is fastened beneath the head of the screw 6 and in order to facilitate this fastening the connection piece 5 is provided with a slot 7 in the upper or outer side of the same and beneath the head of the screw 6. There is between both series of connection terminals on the upper side of the block, a longitudinal ridge 8, which has for its object to form a stopping device for the connection wires introduced beneath the screws 6, so that one of said wires cannot make contact with two opposite terminals at the same time.

The terminal block above referred to is denoted by 10 and is used for getting a simple and reliable box for telephone cables (Figs. 4, 5 and 6). A bottom 9 is fastened to the block 10 by means of two screws 25 passing through the slots 2. This bottom 9 is provided with a plane upper or inner side and a packing, consisting of a blotting paper 11 or the like is placed between the bottom 9 and the block 10. To the recess 1 in the bottom of the block 10, there corresponds a depression 12 in the bottom 9, this latter being provided with a pipe 13 adapted for guiding the cable and for fastening the same by soldering. The bottom 9 is fastened to the shell by means of screws 14. The shell consists of four side walls 15, 16, 17, 18, one of which, 16, is provided with two lugs 19, 20, for attaching the shell to a wall, and a cover 21 being pivotally secured to the lugs on the shell by means of the screws 22 and 23. The bottom 9 is, furthermore provided with holes 24, through which the outer conductors are drawn into the box.

The cable box is used in the following manner. The detachable upper part 16 is by means of screws secured to a wall, about three meters from the ground after the bottom 9 has been removed. The cable is drawn through the pipe 13 and is connected with the springs 4 on the rear side of the terminal block. During this operation the block is disengaged from the bottom 9. The bottom 9 is then secured to the block 10 by means of the screws 25, after the blotting paper 11 has been laid between the block and the bottom, whereupon the cable is secured in the pipe 13 by soldering. Before the bottom 9 is secured to the block 10, the recess 1 is to be filled with a hard mass, whereby a completely air-tight inclosure of the cable wires is obtained. After the cable has thus been connected with the terminals and the detachable bottom 9 secured to the block 10, the said bottom is fastened to the shell by means of the screws 14. The connection of the subscriber conduits with the terminals is executed in such a manner that a two wire cable may be drawn through a hole 24 in the bottom 9 and its wires are introduced beneath the heads of two connecting screws 6 on the block 10.

The use of the terminal block in combination with cable boxes adapted to greater cables is elucidated by Figs. 7, 8 and 9. The box consists of a casing with a plane upper side 26, a detachable back piece 27 and a pipe 28 for the insertion of the cable. The upper side is provided with oblong holes 29, each corresponding to the recess in the bottom of the terminal block. The blocks are fastened to the plane upper or outer side 26 by means of screws and are packed by the insertion of blotting paper 30. The box is provided with lugs 31 adapted for the fastening of the box in the cable case. The connection of the cable in the box is carried out in such a manner that the cable is introduced through the pipe 28, after the back piece 27 has been removed. The cable wires are connected with the connecting springs 4, and after all wires are connected up, the back piece 27 is screwed on, so that a tight inclosure is obtained.

This invention has been found to be capable of practical use with as many as 100-lines.

What we claim is:

In combination, a box, a bottom removable from said box, a terminal block secured to said bottom, the said box being provided with lugs for securing the box to a support and a cover hinged to said lugs in position to close the top of the box.

In witness whereof we have hereunto signed our names in the presence of two subscribing witnesses.

KARL FREDRIK WINCRANTZ.
CARL ERIK JEAN NILSON.
CARL FILIP PETTERSSON.

Witnesses:
OSCAR GRAHN,
HOWARD NYSTRON.

Copies of this patent may be obtained for five cents each, by addressing the "Commissioner of Patents, Washington, D. C."